United States Patent
Nishimura et al.

(10) Patent No.: US 9,316,138 B2
(45) Date of Patent: Apr. 19, 2016

(54) SADDLE TYPE VEHICLE

(71) Applicant: HONDA MOTOR CO., LTD., Tokyo (JP)

(72) Inventors: Shin Nishimura, Wako (JP); Katsuaki Shibuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/637,123

(22) Filed: Mar. 3, 2015

(65) Prior Publication Data
US 2015/0252713 A1 Sep. 10, 2015

(30) Foreign Application Priority Data

Mar. 5, 2014 (JP) ................. 2014-042519
Jun. 6, 2014 (JP) ................. 2014-118188

(51) Int. Cl.
| | | |
|---|---|---|
| *F01N 3/34* | (2006.01) | |
| *F01N 3/30* | (2006.01) | |
| *F02B 61/02* | (2006.01) | |
| *F02B 75/22* | (2006.01) | |
| *B60K 13/04* | (2006.01) | |
| *B62K 11/04* | (2006.01) | |

(52) U.S. Cl.
CPC . *F01N 3/34* (2013.01); *B60K 13/04* (2013.01); *B62K 11/04* (2013.01); *F01N 3/30* (2013.01); *F02B 61/02* (2013.01); *F02B 75/22* (2013.01); *F01N 2590/04* (2013.01)

(58) Field of Classification Search
CPC ........... F01N 3/34; B62K 11/04; B60K 13/04
USPC ....................................................... 180/219
See application file for complete search history.

(56) References Cited

U.S. PATENT DOCUMENTS

| | | | | | |
|---|---|---|---|---|---|
| 4,387,565 | A | * | 6/1983 | Otani | F01N 3/34 180/219 |
| 4,430,857 | A | * | 2/1984 | Ikenoya | F01N 3/34 60/274 |
| 4,434,615 | A | * | 3/1984 | Ikenoya | F01N 3/34 180/219 |
| 4,437,306 | A | * | 3/1984 | Ikenoya | F01N 3/34 180/319 |
| 4,454,714 | A | * | 6/1984 | Ikenoya | F01N 3/34 180/219 |

(Continued)

FOREIGN PATENT DOCUMENTS

| | | |
|---|---|---|
| JP | 58-185920 A | 10/1983 |
| JP | 59-194024 A | 11/1984 |

(Continued)

*Primary Examiner* — Anne Marie Boehler
*Assistant Examiner* — Michael Stabley
(74) *Attorney, Agent, or Firm* — Birch, Stewart, Kolasch & Birch, LLP

(57) ABSTRACT

A secondary air supply system is arranged efficiently and compactly, in a V-type engine including a front-side cylinder and a rear-side cylinder. A motorcycle has a secondary air supply system which is provided between an air cleaner and an exhaust passage of an engine. The secondary air is supplied from the air cleaner into the exhaust passage of the engine. The secondary air supply system has a reed valve in a position for being exposed to the exhaust passage. The reed valve includes a front-side reed valve used for a front-side cylinder and a rear-side reed valve used for a rear-side cylinder. The front-side reed valve is disposed at a front portion of the air cleaner, with the longitudinal direction of the front-side reed valve set along the height direction.

20 Claims, 12 Drawing Sheets

(56) References Cited

U.S. PATENT DOCUMENTS

| | | | | |
|---|---|---|---|---|
| 4,727,717 A * | 3/1988 | Ikenoya | ............... | F01L 3/205 180/219 |
| 6,311,483 B1 * | 11/2001 | Hori | ............... | F01N 3/34 60/293 |
| 7,201,119 B2 * | 4/2007 | Tawarada | ............... | F02B 63/02 123/195 R |
| 7,458,344 B2 * | 12/2008 | Holtorf | ............... | F02B 25/24 123/65 V |
| 7,500,476 B2 * | 3/2009 | Tawarada | ............... | F02F 7/006 123/572 |
| 7,765,973 B2 * | 8/2010 | Matsuda | ............... | F01L 1/022 123/90.14 |
| 8,181,614 B2 * | 5/2012 | Sugiura | ............... | F01L 1/053 123/193.5 |
| 8,695,328 B2 * | 4/2014 | Shimizu | ............... | F01N 3/303 60/289 |
| 2012/0222414 A1 * | 9/2012 | Shimizu | ............... | F01N 3/303 60/311 |
| 2015/0086434 A1 * | 3/2015 | Kimura | ............... | F01N 3/101 422/169 |

FOREIGN PATENT DOCUMENTS

| | | |
|---|---|---|
| JP | 06-272554 A | 9/1994 |
| JP | 200-355439 A | 12/2001 |
| JP | 2007-009707 A | 1/2007 |

* cited by examiner

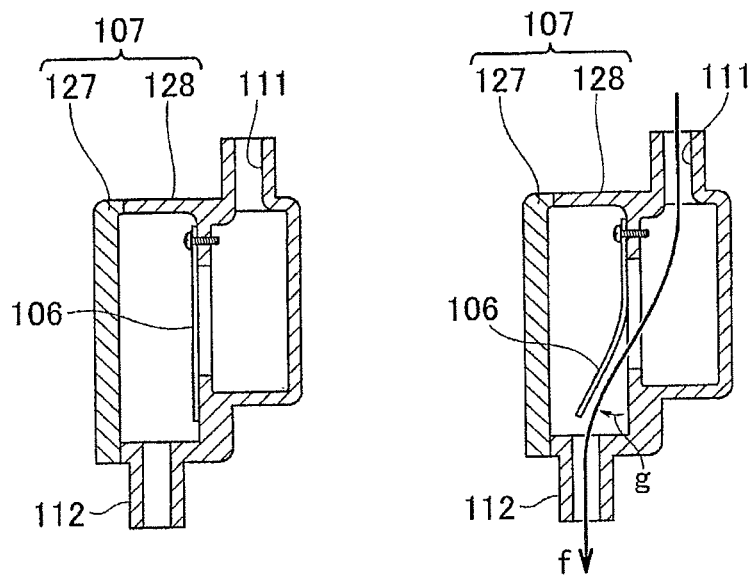
FIG. 11(a)  FIG. 11(b)
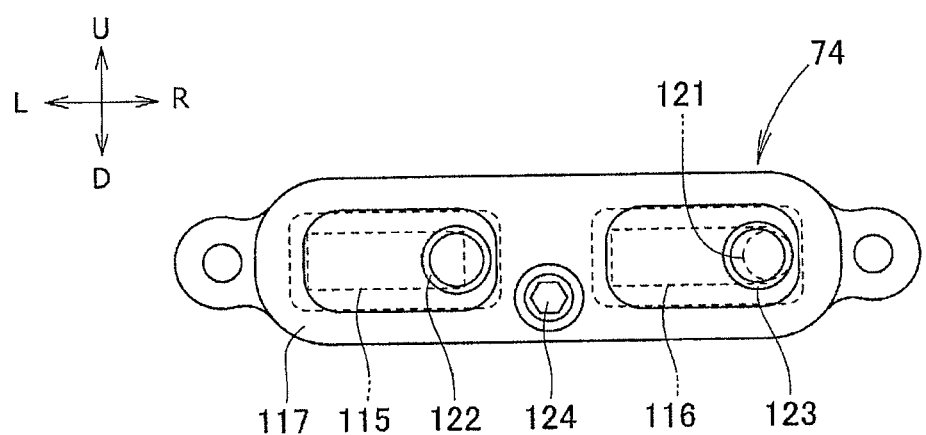
FIG. 12

SADDLE TYPE VEHICLE

CROSS-REFERENCE TO RELATED APPLICATIONS

The present application claims priority under 35 USC 119 to Japanese Patent Application No. 2014-042519 filed Mar. 5, 2014 and Japanese Patent Application No. 2014-118188 filed Jun. 6, 2014 the entire contents of which are hereby incorporated by reference.

BACKGROUND OF THE INVENTION

1. Field of the Invention

The present invention relates to an improvement in a saddle type vehicle provided with a secondary air supply system.

2. Description of Background Art

A saddle type vehicle is known wherein a secondary air supply system is provided for clarifying an exhaust gas by combustion of unburned components present in the exhaust gas. See, for example, Japanese Patent No. 3237285, FIGS. 1 and 2.

As shown in FIGS. 1 and 2 of Japanese Patent No. 3237285, in a saddle type motorcycle, a pair of main frames (16) (parenthesized numerals used herein are reference numerals used in Japanese Patent No. 3237285, the same shall apply hereinafter) extend rearwardly from a head pipe (15) with an engine (9) being suspended on the main frames (16). The secondary air supply system is disposed between the engine (9) and the main frames (16). The secondary air supply system is provided with reed valves (12, 12) which are each opened when a predetermined negative pressure is exerted thereon. The reed valves (12, 12) are disposed to be exposed to an exhaust passage of the engine (9).

The engine (9) mounted on the saddle type vehicle in Japanese Patent No. 3237285 is a two-cylinder engine in which two cylinders of the engine are arranged in a row along the transverse direction of the vehicle. In an engine different in cylinder layout from this type of engine, for example, in a so-called V-type engine in which a plurality of cylinders are arranged in a V-shaped configuration with a crankshaft at the vertex of the V shape, a preferable layout for the secondary air supply system may be different from that in the above-mentioned type.

It is desired to develop a technology that enables an efficient and compact layout of a secondary air supply system in a so-called V-type engine which includes a front-side cylinder or cylinders and a rear-side cylinder or cylinders.

SUMMARY AND OBJECTS OF THE INVENTION

It is an object of an embodiment of the present invention to provide a technology by which a secondary air supply system can be arranged efficiently and compactly in a V-type engine which includes a front-side cylinder and a rear-side cylinder.

In accordance with an embodiment of the present invention, there is provided a saddle type vehicle including: a body frame which includes a head pipe and a pair of main frames extending rearwardly from the head pipe with an engine mounted on the body frame. The engine includes a front-side cylinder directed toward a front side of the vehicle and a rear-side cylinder directed toward a rear side of the vehicle. An air cleaner is disposed in a space defined between the front-side cylinder and the rear-side cylinder on an upper side of the engine with a secondary air supply system having a reed valve between the air cleaner and an exhaust passage of the engine. The secondary air supply system is adapted to supply secondary air from the air cleaner into the exhaust passage of the engine or to stop the supply of the secondary air, with the engine and the air cleaner being disposed between the pair of main frames. The saddle type vehicle is characterized in that the reed valve includes a front-side reed valve used for the front-side cylinder and a rear-side reed valve used for the rear-side cylinder. The front-side reed valve is disposed at a front portion of the air cleaner, with a longitudinal direction of the front-side reed valve set along a height direction. In addition, the rear-side reed valve is disposed at a rear portion of the air cleaner, with a longitudinal direction of the rear-side reed valve set along a transverse direction of the vehicle.

In accordance with an embodiment of the present invention, the saddle type vehicle is characterized in that a front-side cylinder exhaust pipe adapted to guide an exhaust gas is connected to an exhaust port of the front-side cylinder. The front-side cylinder exhaust pipe extends forward and then extends while bending so as to point rearwardly with a deviation toward one side or the other side with respect to a center line across the width of the vehicle. The front-side reed valve is disposed with an offset toward the same side, with respect to the center line across the width of the vehicle, as the deviation of the front-side cylinder exhaust pipe. In addition, the front-side reed valve and the front-side cylinder exhaust pipe are connected together by a front pipe line member.

In accordance with an embodiment of the present invention, the saddle type vehicle is characterized in that: the front-side cylinder includes a plurality of cylinders arranged in a row in the transverse direction of the vehicle. The front-side reed valve includes a plurality of reed valves arranged in a row in the transverse direction of the vehicle.

In accordance with an embodiment of the present invention, the saddle type vehicle is characterized in that a rear-side cylinder exhaust pipe, adapted to guide the exhaust gas, is connected to an exhaust port of the rear-side cylinder; the rear-side cylinder exhaust pipe extends so as to point rearwardly with a deviation toward one side or the other side with respect to a center line across the width of the vehicle. The rear-side reed valve is disposed with an offset toward the same side as the deviation of the rear-side cylinder exhaust pipe. In addition, the rear-side reed valve and the rear-side cylinder exhaust pipe are connected together by a rear pipe line member.

In accordance with an embodiment of the present invention, the saddle type vehicle is characterized in that the rear-side cylinder includes a plurality of cylinders arranged in a row in the transverse direction of the vehicle. The rear-side reed valve includes a plurality of reed valves arranged in a row in the transverse direction of the vehicle.

In accordance with an embodiment of the present invention, the saddle type vehicle is characterized in that an upper end of the rear-side cylinder is covered with a rear-side head cover. A rear igniter is installed on the rear-side head cover with the rear pipe line member extending from a front side toward a rear side of the vehicle, on a lateral side of the rear igniter.

In accordance with an embodiment of the present invention, the saddle type vehicle is characterized in that the front-side reed valve and the body frame overlap each other, in side view of the vehicle.

In accordance with an embodiment of the present invention, the saddle type vehicle is characterized in that the plurality of front-side reed valves are housed by a united case member.

In accordance with an embodiment of the present invention, the saddle type vehicle is characterized in that the plurality of rear-side reed valves are housed by a united case member.

According to an embodiment of the present invention, the front-side reed valve is disposed at the front portion of the air cleaner, on the rear side of the head pipe, in such a manner that the longitudinal direction of the front-side reed valve lies along the height direction. On the rear side of the head pipe and on the front side of the air cleaner, it is easier to secure a space in the height direction than to secure a space in the transverse direction of the vehicle. Since the front-side reed valve is thus disposed at the front portion of the air cleaner so that the longitudinal direction of the front-side reed valve lies along the height direction, the front-side reed valve can be arranged efficiently and compactly.

In addition, the rear-side reed valve is disposed at the rear portion of the air cleaner between the pair of main frames, in such a manner that the longitudinal direction of the rear-side reed valve lies along the transverse direction of the vehicle. On the rear side of the air cleaner, it is easier to secure a space in the transverse direction of the vehicle than to secure a space in the height direction. Since the rear-side reed valve is thus disposed at the rear portion of the air cleaner so that the longitudinal direction of the rear-side reed valve lies along the transverse direction of the vehicle, the rear-side reed valve can be arranged efficiently and compactly. Since the front-side reed valve and the rear-side reed valve can be arranged compactly, an influence of the reed valve on the component parts arranged in the surroundings of the reed valve can be reduced.

According to an embodiment of the present invention, the front-side cylinder exhaust pipe and the front-side reed valve are arranged with a deviation and an offset toward the same side with respect to the center line across the width of the vehicle. This ensures that the front pipe line member for interconnecting the front-side reed valve and the front-side cylinder exhaust pipe can be made shorter in length. In addition, the front pipe line member can be confirmed (checked) from an outer side with respect to the center line across the width of the vehicle, which leads to an enhanced maintainability.

According to an embodiment of the present invention, the front-side reed valve includes a plurality of reed valves corresponding to the plurality of front-side cylinders arranged in a row in the transverse direction of the vehicle, and the plurality of reed valves are arranged in a row in the transverse direction of the vehicle. Therefore, the front pipe line members for interconnecting front-side exhaust pipes and the front-side reed valve can be arranged compactly and efficiently.

According to an embodiment of the present invention, the rear-side cylinder exhaust pipe and the rear-side reed valve are arranged with a deviation and an offset toward the same side with respect to the center line across the width of the vehicle. This enables the rear pipe line member for interconnecting the rear-side reed valve and the rear-side cylinder exhaust pipe to be simplified on a piping basis.

According to an embodiment of the present invention, the rear-side reed valve includes a plurality of reed valves corresponding to the plurality of rear-side cylinders arranged in a row in the transverse direction of the vehicle with the plurality of reed valves being arranged in a row in the transverse direction of the vehicle. Therefore, the rear pipe line members for interconnecting rear-side exhaust pipes and the rear-side reed valve can be arranged compactly and efficiently.

According to an embodiment of the present invention, the rear pipe line member for interconnecting the rear-side reed valve and the rear-side cylinder exhaust pipe extends from a front side toward a rear side of the vehicle, on a lateral side of the rear igniter. With the rear pipe line member thus disposed without protruding to the upper side of the rear igniter that is provided for the rear-side cylinder, the rear pipe line member can be arranged compactly and efficiently.

According to an embodiment of the present invention, the front-side reed valve and the body frame overlap each other, in side view of the vehicle. With the front-side reed valve arranged in the manner of being hidden behind the main frame, the front-side reed valve can be protected by the body frame.

According to an embodiment of the present invention, the plurality of front-side reed valves are housed by a united case member. Since the plurality of front-side reed valves are housed in the united case member, an increase in the number of component parts can be restrained.

According to an embodiment of the present invention, the plurality of rear-side reed valves are housed by a united case member. Since the plurality of rear-side reed valves are housed in the united case member, an increase in the number of component parts can be restrained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(*a*) and 11(*b*) are sectional views taken along line 11-11 of FIG. 10;

FIG. 12 is a front view of the rear-side reed valve;

DETAILED DESCRIPTION OF THE PREFERRED EMBODIMENTS

Figure 1:
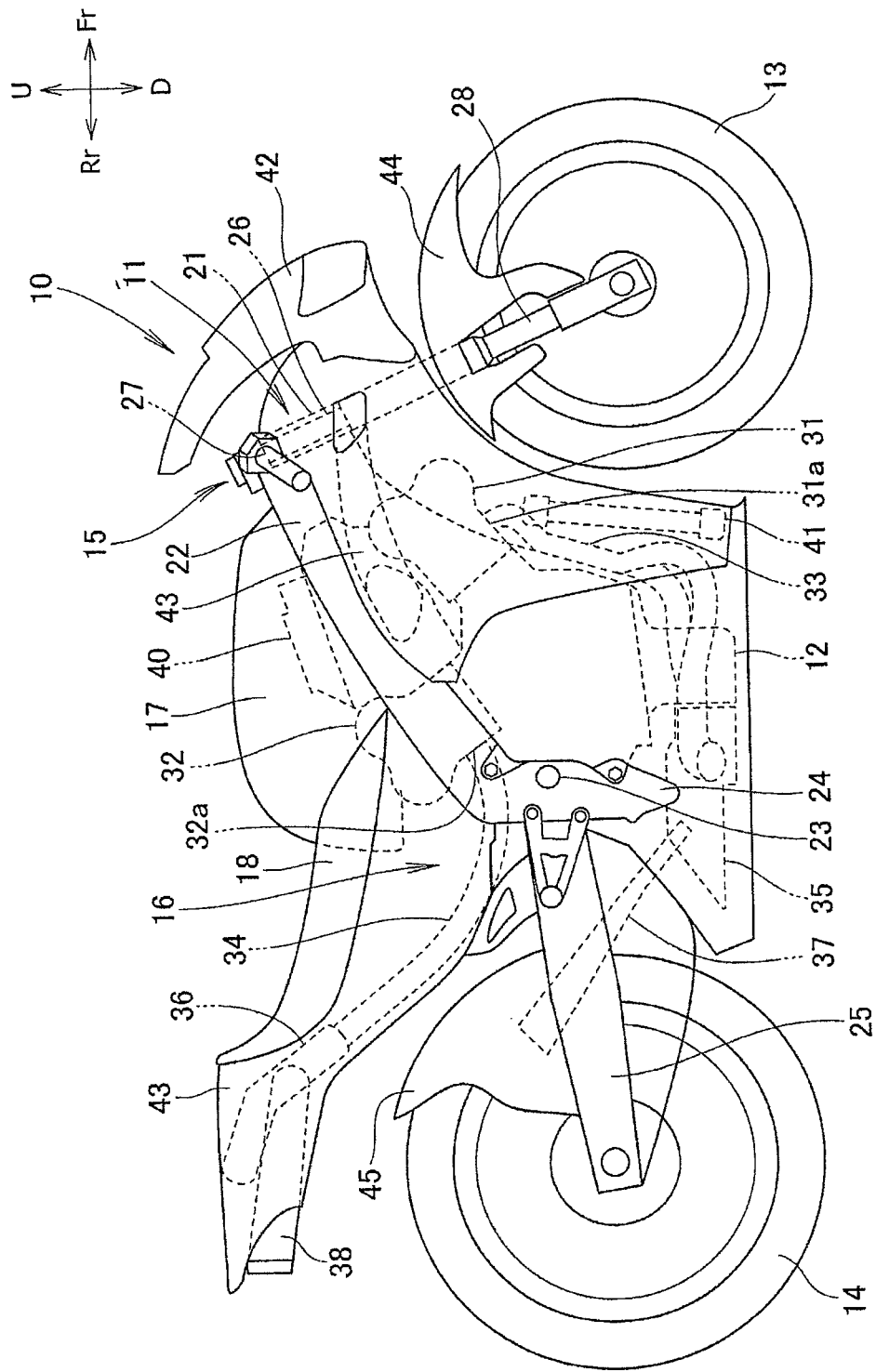
FIG. 1 is a right side view of a motorcycle according to the present invention.

Some embodiments of the present invention will be described in detail below. In the drawings and embodiments, the expressions "up (U)," "down (D)," "front (Fr)," "rear (Rr)," "left (L)" and "right (R)" are the respective directions as viewed from a rider riding on a motorcycle.

An embodiment of the present invention will be described on the basis of the drawings.

As shown in FIG. 1, a motorcycle 10 is a saddle type vehicle which includes a body frame 11; an engine 12 as a motive power source that is mounted on the body frame 11; a front wheel steering portion 15 that is provided on a front portion of the body frame 11 forwardly of the engine 12 and by which a front wheel 13 is supported in a steerable manner and a rear wheel suspension unit 16 that is provided on a rear portion of the body frame 11 and by which a rear wheel 14 is supported in a swingable manner. A fuel tank 17 is mounted to the body frame 11 upwardly of the engine 12 with a rider seat 18 mounted to the body frame 11 rearwardly of the fuel tank 17. A rider rides the vehicle astride the rider seat 18.

The body frame 11 is composed mainly of a head pipe 21; a pair of left and right main frames 22 extending rearwardly from the head pipe 21 and a pivot frame 24 which extends downward from rear ends of the main frames 22 and which supports a pivot shaft 23 serving as a support shaft for the rear wheel suspension unit 16.

The rear wheel suspension unit 16 has a swing arm 25 that extends rearwardly from the pivot shaft 23 and supports the rear wheel 14 on a rear end thereof. The front wheel steering portion 15 includes a steering shaft 26 passed through the head pipe 21 and serving as a rotational shaft; a steering handle 27 mounted to an upper end of the steering shaft 26 and a front fork 28 which is provided as one body with the steering shaft 26, extends forward and downward, and supports the front wheel 13.

The engine 12 mounted on the body frame 11 is a so-called V-type engine that includes a front-side cylinder 31 directed toward a front side of the vehicle and a rear-side cylinder 32 directed toward a rear side of the vehicle. A front-side cylinder exhaust pipe 33 is connected to an exhaust port 31a of the front-side cylinder 31. The front-side cylinder exhaust pipe 33 extends in a forward direction and then extends while bending so as to point rearwardly. A chamber 35 on one side, in which a catalyzer is incorporated, is connected to a rear end of the front-side cylinder exhaust pipe 33. A muffler 37 on one side extends rearwardly from the chamber 35. The rear-side cylinder 32 includes a plurality of cylinders (two cylinders) arranged in a row in the transverse direction of the vehicle. A rear-side cylinder exhaust pipe 34 for guiding an exhaust gas is connected to an exhaust port 32a of the rear-side cylinder 32. The rear-side cylinder exhaust pipe 34 extends rearwardly, and a muffler 38 on the other side is connected thereto through a chamber 36 on the other side, in which a catalyzer is incorporated. An air cleaner 40 is disposed in a space defined between the front-side cylinder 31 and the rear-side cylinder 32, on an upper side of the engine 12.

A radiator unit 41 is disposed rearwardly of the front wheel 13 and forwardly of the engine 12. A front side of a vehicle body is covered with a cowl 42, and lateral sides of the vehicle body are covered with a body cover 43. A front fender 44 is mounted to the front fork 28 so as to cover an upper side of the front wheel 13. A rear fender 45 is mounted to the swing arm 25 so as to cover a front upper side of the rear wheel 14.

Figure 2:
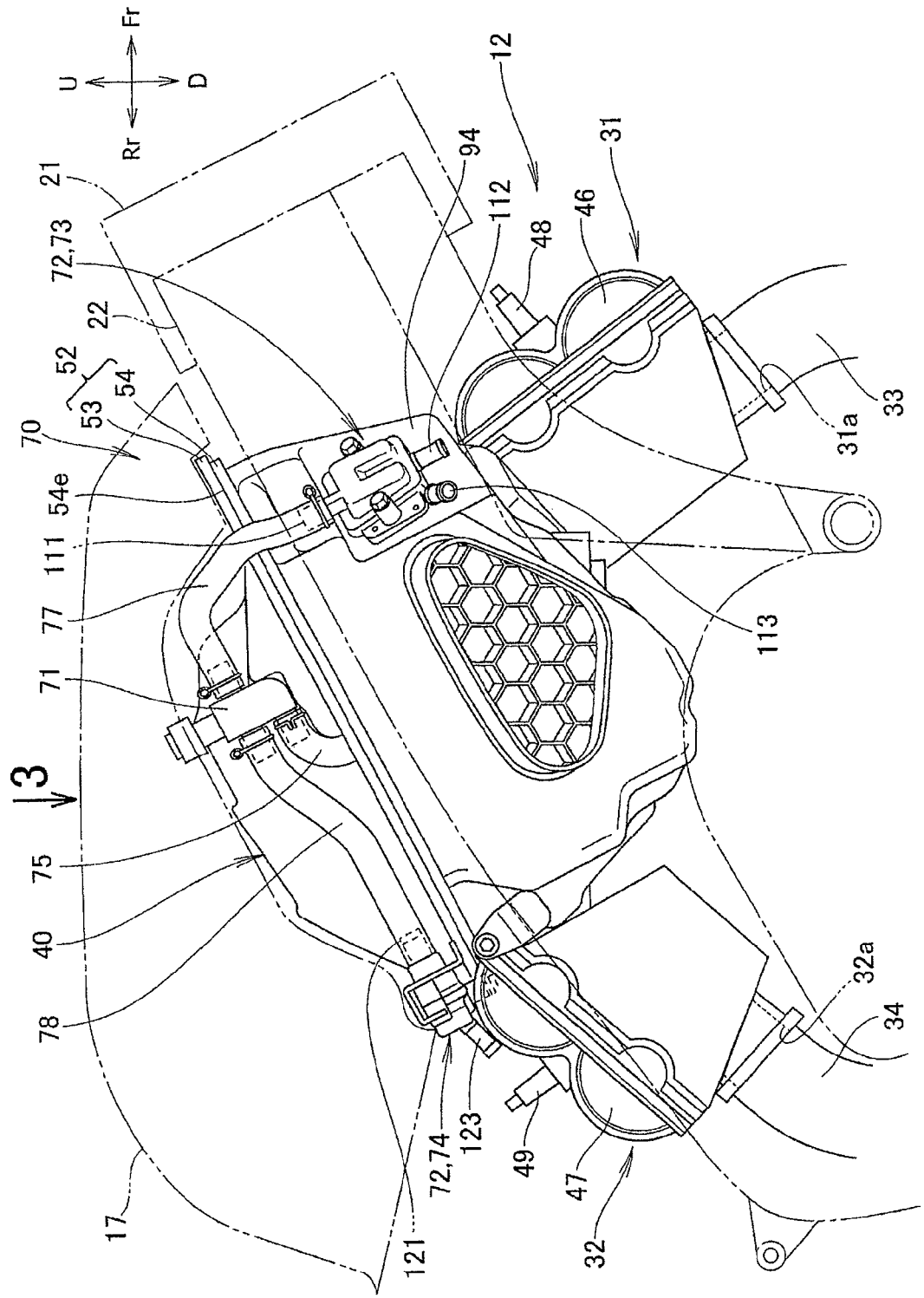
FIG. 2 is a major part enlarged view showing an air cleaner and the surroundings thereof.

As shown in FIG. 2, an upper end of the front-side cylinder 31 of the engine 12 is covered with a front-side head cover 46, and a front igniter 48 is installed on the front-side head cover 46. Similarly, an upper end of the rear-side cylinder 32 is covered with a rear-side head cover 47, and a rear igniter 49 is installed on the rear-side head cover 47.

The front-side cylinder 31 includes a plurality of cylinders (two cylinders) arranged in a row in the transverse direction of the vehicle. The front-side cylinder exhaust pipe 33 for guiding the exhaust gas is connected to the exhaust port 31a of the front-side cylinder 31. The rear-side cylinder 32 includes a plurality of cylinders (two cylinders) arranged in a row in the transverse direction of the vehicle. The rear-side cylinder exhaust pipe 34 for conducting the exhaust gas is connected to the exhaust port 32a of the rear-side cylinder 32. Thus, the front-side cylinder 31 includes the two cylinders arranged in a row in the transverse direction of the vehicle, and the rear-side cylinder 32 includes the two cylinders arranged in a row in the transverse direction of the vehicle. In other words, the engine 12 is a front-two-cylinder, rear-two-cylinder V-type engine.

In an area ranging from an upper side of the air cleaner 40 (which is disposed in the space defined between the front-side cylinder 31 and the rear-side cylinder 32 on the upper side of the engine 12) toward the rear side of the vehicle, the fuel tank 17 is disposed in such a manner as to over the air cleaner 40.

Figure 3:
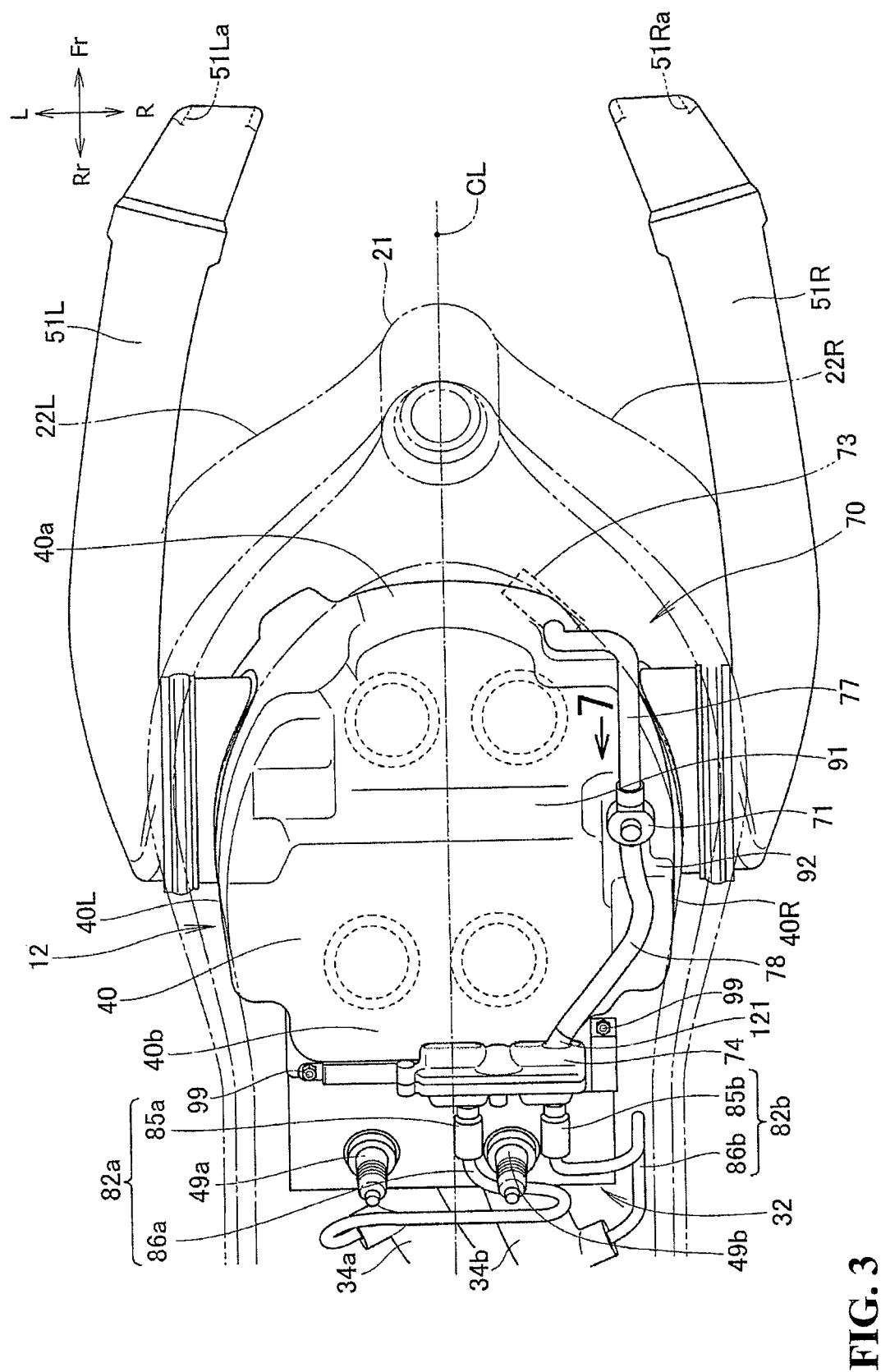
FIG. 3 is a plan view of the air cleaner and the surroundings thereof, which is a view along arrow 3 of FIG. 2.

As depicted in FIG. 3, the engine 12 and the air cleaner 40 are disposed between the pair of main frames 22L and 22R. Intake ducts 51L and 51R for introducing air into the air cleaner 40 are connected to side surfaces 40L and 40R (extending across the width of the vehicle) of the air cleaner 40. The intake ducts 51L and 51R are provided with intake ports 51La and 51Ra at front ends thereof.

The structure of the air cleaner will be mainly described below.

Figure 4:
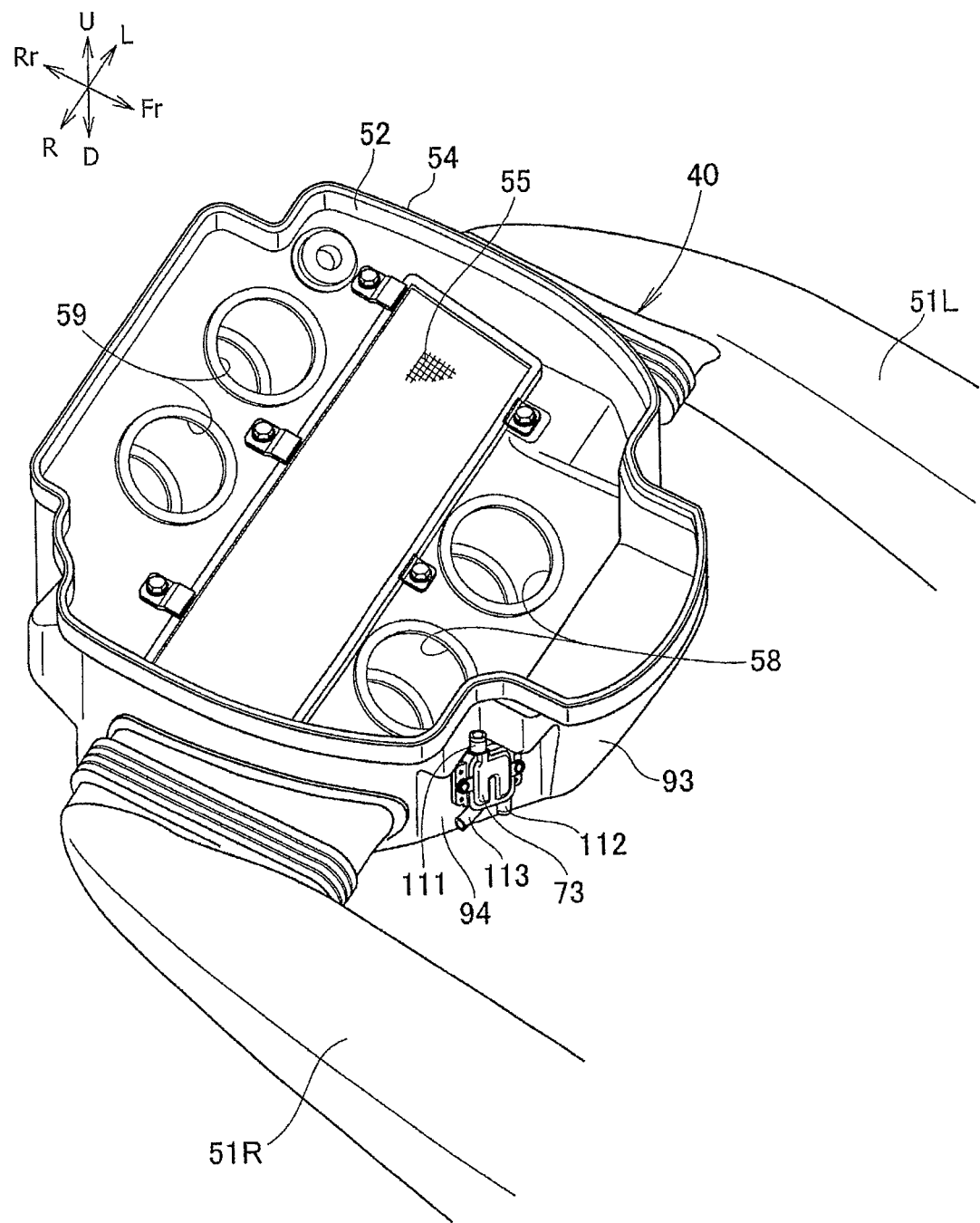
FIG. 4 is a perspective view for explaining the structure of the air cleaner.
Figure 5:
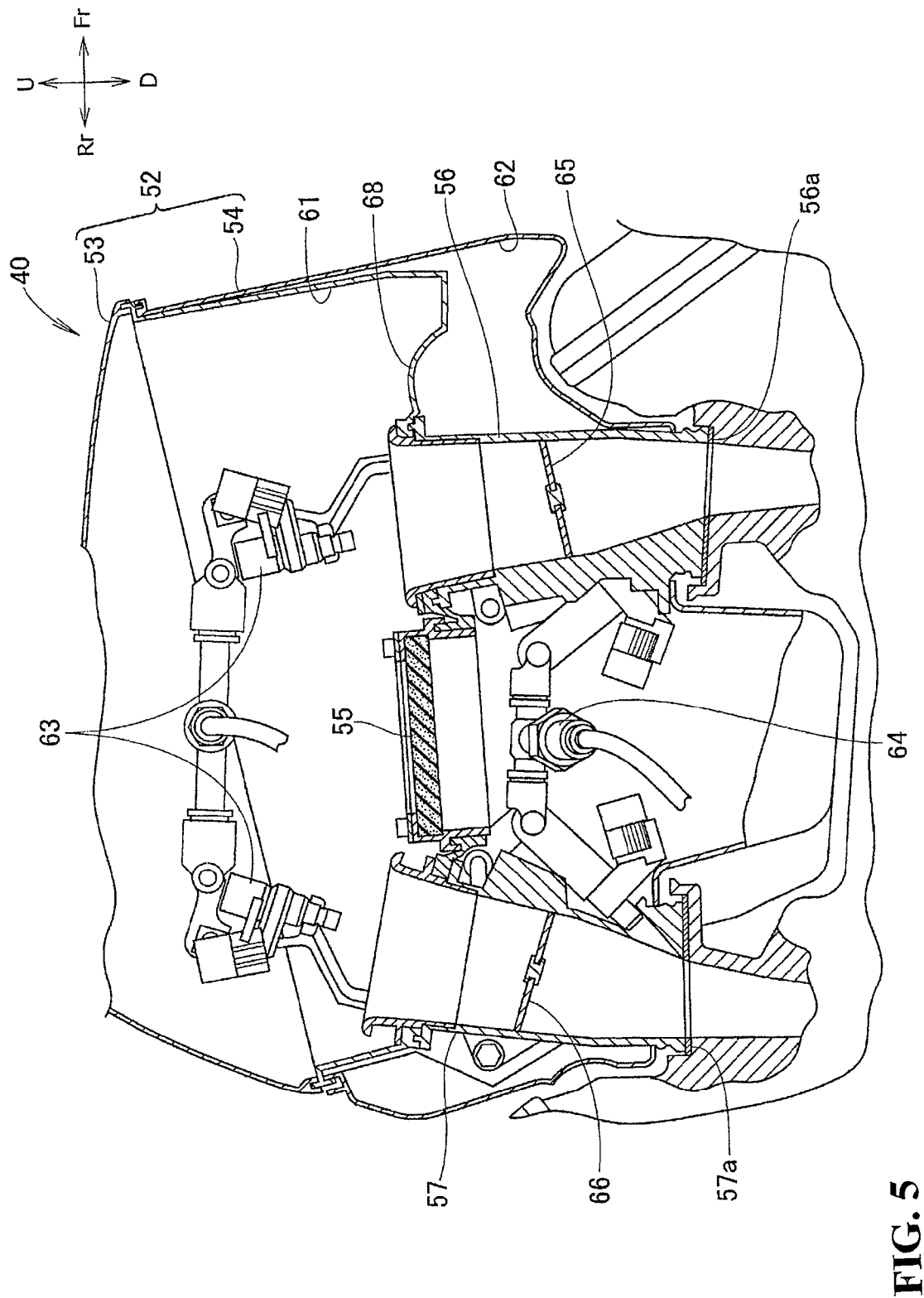
FIG. 5 is a sectional view for explaining the structure of the air cleaner.

As shown in FIGS. 4 and 5, the air cleaner 40 has a case body 52 and an element 55 provided inside the case body 52 so as to filtrate air, thereby cleaning the air. The case body 52 has an upper half 53 and a lower half 54 abutted on each other from the upper and lower sides. On the front and rear sides of the element 55, there are provided front and rear funnel holes 58 and 59 to which front funnels 56 and rear funnels 57 for supplying cleaned air to the front-side cylinder 31 and the rear-side cylinder 32 are mounted in an inserted manner.

The case body 52 is partitioned by the element 55 and a partition wall 68 into a clean side 61 and a dirty side 62. The clean side 61 is defined on the upper side in the case body 52, whereas the dirty side 62 is defined on the lower side in the case body 52. First injection nozzles 63 for supplying an atomized fuel are provided inside the case body 52 in such positions as to be exposed to inlets of the front and rear funnels 56 and 57. A second injection nozzle 64 is provided downstream of the first injection nozzles 63. At intermediate portions in the axial direction in the front and rear funnels 56 and 57, throttle valves 65 and 66 are provided between the first injection nozzle 63 and the second injection nozzle 64. A front seal member 56a for preventing leakage of intake air is interposed between the front-side cylinder 32 of the engine 12 (see FIG. 2) and the front funnel 56. Similarly, a rear seal member 57a for preventing leakage of intake air is interposed between the rear-side cylinder 32 of the engine 12 and the rear funnel 57.

Air taken into the dirty side 62, which constitutes a lower half of the air cleaner 40, from lateral sides of the air cleaner 40 via the intake ducts 51L and 51R is filtered by the element 55 when flowing through the element 55 into the clean side 61 which constitutes an upper half of the air cleaner 40. The filtered clean air then flows toward the intake side of the engine 12 (see FIG. 2) by way of the front and rear funnels 56 and 57 is disposed so as to be exposed to the clean side 61.

A secondary air supply system for clarifying the exhaust gas by combustion of combustible components present in the exhaust gas will be described below.

Referring back to FIGS. 2 and 3, a secondary air supply system 70 includes a solenoid valve 71 for supplying the cleaned air in the air cleaner 40 to an exhaust system or stopping the supply of the cleaned air and reed valves 72 provided downstream of the solenoid valve 71 that are individually opened and closed depending on negative pressures in the exhaust passages (at the exhaust ports 31a and 32a) of the engine 12. The reed valves 72 include a front-side reed valve 73 and a rear-side reed valve 74. The front-side reed valve 73 is disposed at a front portion 40a of the air cleaner 40, and the rear-side reed valve 74 is disposed at a rear portion 40b of the air cleaner 40.

The air cleaner 40 and the solenoid valve 71 are interconnected by a connection pipe line 75 for supplying the cleaned air from the air cleaner 40 to the solenoid valve 71. The solenoid valve 71 and the front-side reed valve 73 are interconnected by an upstream-side front pipe line 77. The solenoid valve 71 and the rear-side reed valve 74 are interconnected by an upstream-side rear pipe line 78.

Figure 6:
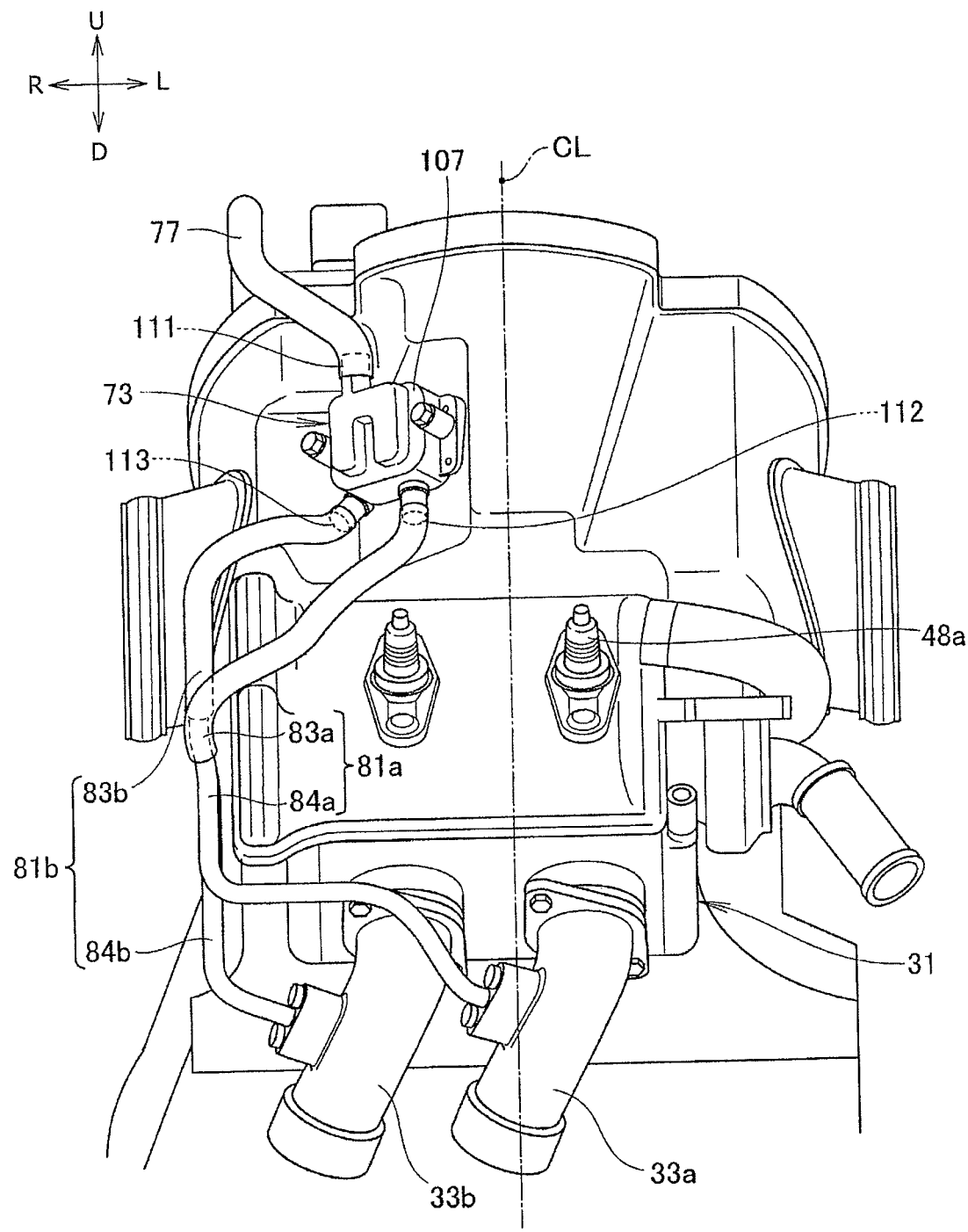
FIG. 6 is a front view of the air cleaner and the surroundings thereof.

As shown in FIG. 6, front pipe line members 81a and 81b extend from the front-side reed valve 73. Tips of the front pipe line members 81a and 81b are connected to the respective exhaust passages (the front-side cylinder exhaust pipes 33) of the engine 12. As illustrated in FIG. 3, rear pipe line members 82a and 82b extend from the rear-side reed valve 74. Tips of the rear pipe line members 82a and 82b are connected to the respective exhaust passages (the rear-side cylinder exhaust pipes 34) of the engine 12. The rear-side reed valve 74 and the rear-side cylinder exhaust pipe 34 are interconnected by the rear pipe line member 82. In other words, the reed valve 72 is disposed between the air cleaner 40 and the exhaust passage of the engine 12, in such a position as to be exposed to the exhaust passage.

More specifically, the reed valve 72 includes the front-side reed valve 73 and the rear-side reed valve 74. The front-side reed valve 73 and the rear-side reed valve 74 are used for the front-side cylinders 31 and the rear-side cylinders 32, respectively, so as to supply secondary air from the air cleaner 40 into the exhaust passages of the engine 12.

In FIGS. 1 and 6, the front-side cylinder exhaust pipe 33 extend in a forward direction and then extend while bending so as to point rearwardly with a deviation to a right side with respect to the center line across the width of the vehicle. The front-side reed valve 73 is disposed with an offset to the right side, namely, the same side, with respect to the center line across the width of the vehicle, as the deviation of the front-side cylinder exhaust pipe 33. The front-side reed valve 73 is connected to the front-side cylinder exhaust pipes 33a and 33b by the front pipe line members 81a and 81b, respectively. In FIGS. 1 and 6, a center line CL extends across the width of the vehicle. Note that while the front-side cylinder exhaust pipes and the front-side reed valve are disposed with an offset toward the right side with respect to the center line across the width of the vehicle in this embodiment, they may be disposed with an offset toward the left side with respect to the center line.

The front pipe line members 81a and 81b include front tubes 83a and 83b which extend from the front-side reed valve 73 and are made of an elastic material with a low thermal conductivity, such as rubber tubes; and metallic front tubes 84a and 84b which extend from tips of the elastic material-made front tubes 83a and 83b and are connected to the front-side cylinder exhaust pipes 33a and 33b, respectively. Since those portions of the front pipe line members 81a and 81b which are connected to the front-side reed valve 73 are composed of the elastic material-made front tubes 83a and 83b, thermal influence on the front-side reed valve 73 due to heat conduction from the front-side cylinder exhaust pipes 33a and 33b can be reduced. In addition, transfer of vibrations from the front-side cylinder exhaust pipes 33a and 33b to the front-side reed valve 73 is suitably restrained.

The front-side reed valve 73 and the front-side cylinder exhaust pipes 33a and 33b are both disposed on the right side of the center line across the width of the vehicle, and they are interconnected by the front pipe line members 81a and 81b. Therefore, the lengths of the front pipe line members 81a and 81b for connecting the front-side reed valve 73 to the front-side cylinder exhaust pipes 33a and 33b can be made shorter. In addition, the front pipe line members 81a and 81b can be confirmed (checked) from an outer side with respect to the center line across the width of the vehicle, leading to an enhanced maintainability.

As illustrated in FIG. 3, the rear pipe line members 82a and 82b interconnecting the rear-side reed valve 74 and the rear-side cylinder exhaust pipes 34a and 34b extend from the front side toward the rear side of the vehicle, on a lateral side of the rear igniters 49a and 49b.

The rear pipe line members 82 include rear tubes 85a and 85b which extend from the rear-side reed valve 74 and are made of an elastic material with a low thermal conductivity, such as rubber tubes. The metallic rear tubes 86a and 86b extend from tips of the elastic material-made rear tubes 85a and 85b and are connected to the rear-side cylinder exhaust pipes 34a and 34b, respectively. Since those portions of the rear pipe line members 82a and 82b which are connected to the rear-side reed valve 74 are composed of the elastic material-made rear tubes 85a and 85b, a thermal influence on the rear-side reed valve 74 due to heat conduction from the rear-side cylinder exhaust pipes 34a and 34b can be reduced. In addition, transfer of vibrations from the rear-side cylinder exhaust pipes 34 to the rear-side reed valve 74 is suitably restrained.

As illustrated in FIG. 2, the front-side reed valve 73 is disposed on the lower half 54 of the case body 52. In addition, the front-side reed valve 73 and the rear-side reed valve 74 are disposed at substantially equal heights. The pair of main frames 22 and the front-side reed valve 73 are disposed in such positions so as to overlap each other in a side view of the vehicle.

The case body 52 is divided into the upper half 53 and the lower half 54, with a parting face 54e thereof being slanted down rearwardly, in relation to a horizontal plane extending in the longitudinal direction of the vehicle. In addition, the front-side reed valve 73 and the rear-side reed valve 74 are disposed on the case body 52 at substantially equal heights.

Notwithstanding that the parting face 54e of the case body 52 is slanted along the longitudinal direction of the vehicle, the front-side reed valve 73 and the rear-side reed valve 74 are disposed substantially at the same height. This layout makes it possible to realize a well-balanced weight distribution while rendering the case body 52 compact in the height direction.

In FIGS. 1 and 3, the rear-side cylinder exhaust pipes 34a and 34b extend rearwardly with a deviation toward the right side with respect to the center line across the width of the vehicle. The rear-side reed valve 74 is disposed with an offset to the right side, namely, the same side, with respect to the center line across the width of the vehicle, as the deviation of the rear-side cylinder exhaust pipes 34.

The rear-side cylinder exhaust pipes 34a and 34b and the rear-side reed valve 74 are thus disposed with a deviation to a right side, namely, with an offset toward the same side with respect to the center line across the width of the vehicle. This layout enables a simplification of the piping regarding the rear pipe line members 82a and 82b for interconnecting the rear-side reed valve 74 and the rear-side cylinder exhaust pipes 34a and 34b.

The layout of the solenoid valve and the surroundings thereof is mainly described below.

Figure 7:
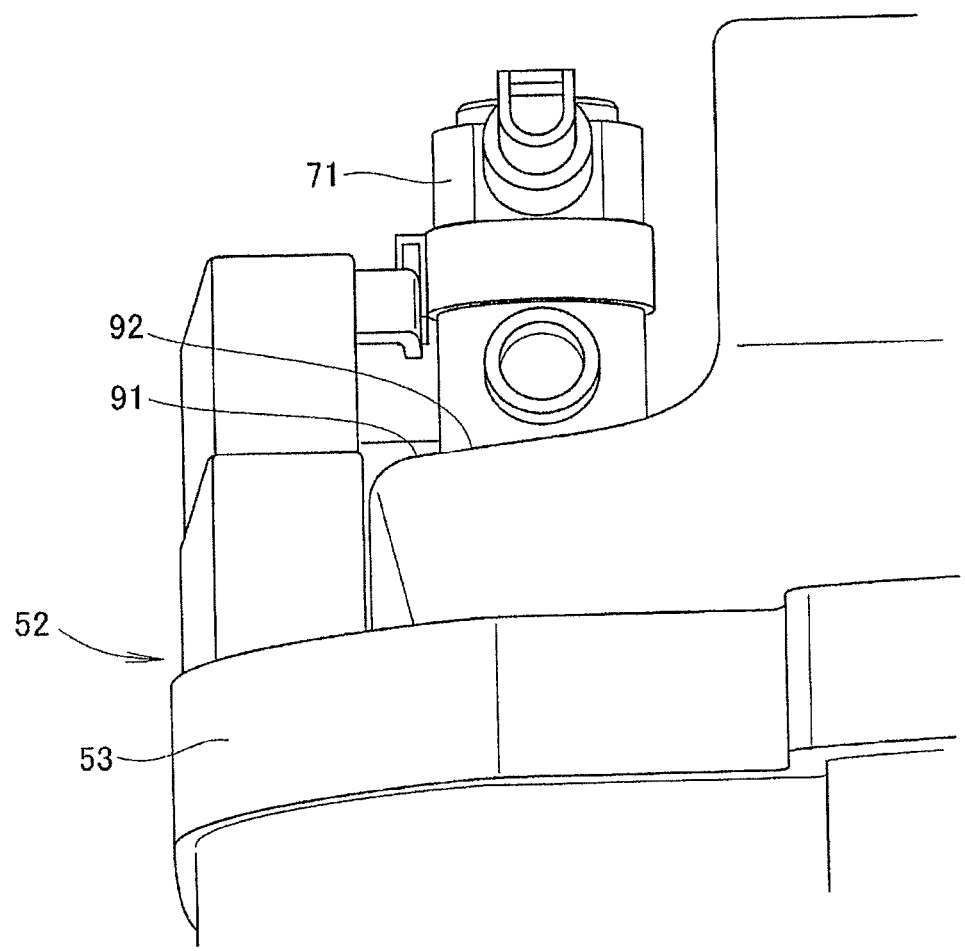
FIG. 7 is a view along arrow 7 of FIG. 3, for explaining a stepped portion formed at an upper surface of the air cleaner.

As depicted in FIG. 7, a ceiling wall 91 constituting the upper half 53 of the air cleaner case (case body 52) is formed with a stepped portion 92 where a difference in height is provided. In FIG. 7, the upstream-side front pipe line is omitted. Referring to FIG. 3, the solenoid valve 71, the upstream-side front pipe line 77 and the upstream-side rear pipe line 78 are disposed on the side of a lower part of the stepped portion 92.

Thus, the solenoid valve 71, the upstream-side front pipe line 77 and the upstream-side rear pipe line 78 are disposed on the side of the lower part of the stepped portion 92 formed as part of the ceiling wall 91 of the air cleaner 40. Since the secondary air supply system 70 is disposed utilizing the lower part side of the stepped portion 92 of the air cleaner 40, the secondary air supply system 70 can be compactly arranged.

A mounting structure for the front-side reed valve is hereinafter described below.

Figure 8:
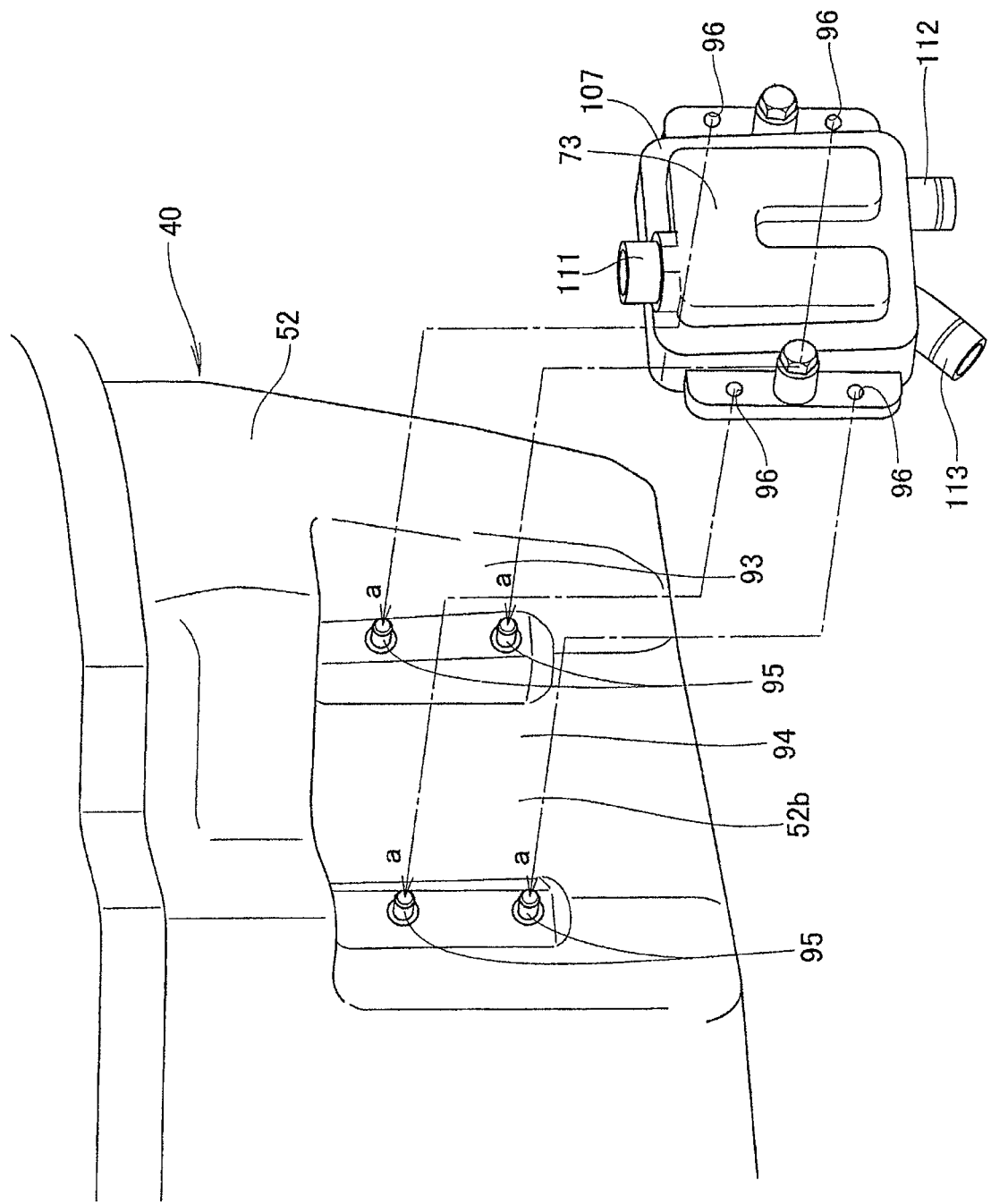
FIG. 8 is an exploded perspective view for explaining a mounting structure of a front-side reed valve.

As illustrated in FIG. 8, the case body 52 of the air cleaner 40 is formed, at a front-side lower portion 52b thereof, with a recessed portion 94 in which to dispose the front-side reed valve 73 in such a manner so as to surround the front-side reed valve 73 by a wall portion 93 of the case body 52. The recessed portion 94 is provided with four projections 95 for positioning the front-side reed valve 73.

Thus, the recessed portion 94, in which to dispose the front-side reed valve 73, is formed at the front-side lower portion 52b of the case body 52. Since the front-side reed valve 73 is surrounded utilizing the recessed portion 94 formed in the case body 52, it is possible to protect the reed valve 72 and to avoid interference between the reed valve 72 and component parts arranged in the surroundings thereof.

In addition, the recessed portion 94 is provided with the four projections 95 for positioning the front-side reed valve 73. At the time of assemblage, four positioning holes 96 provided in the front-side reed valve 73 are fitted over the positioning projections 95 along the direction of arrows a in the figure. In this case, the positioning projections 95 enable the front-side reed valve 73 to be easily mounted onto the front-side lower portion 52b of the case body 52. Accordingly, the workability in assembling (or mounting) the front-side reed valve 73 can be enhanced.

A mounting structure for the rear-side reed valve is hereinafter mainly described below.

Figure 9:
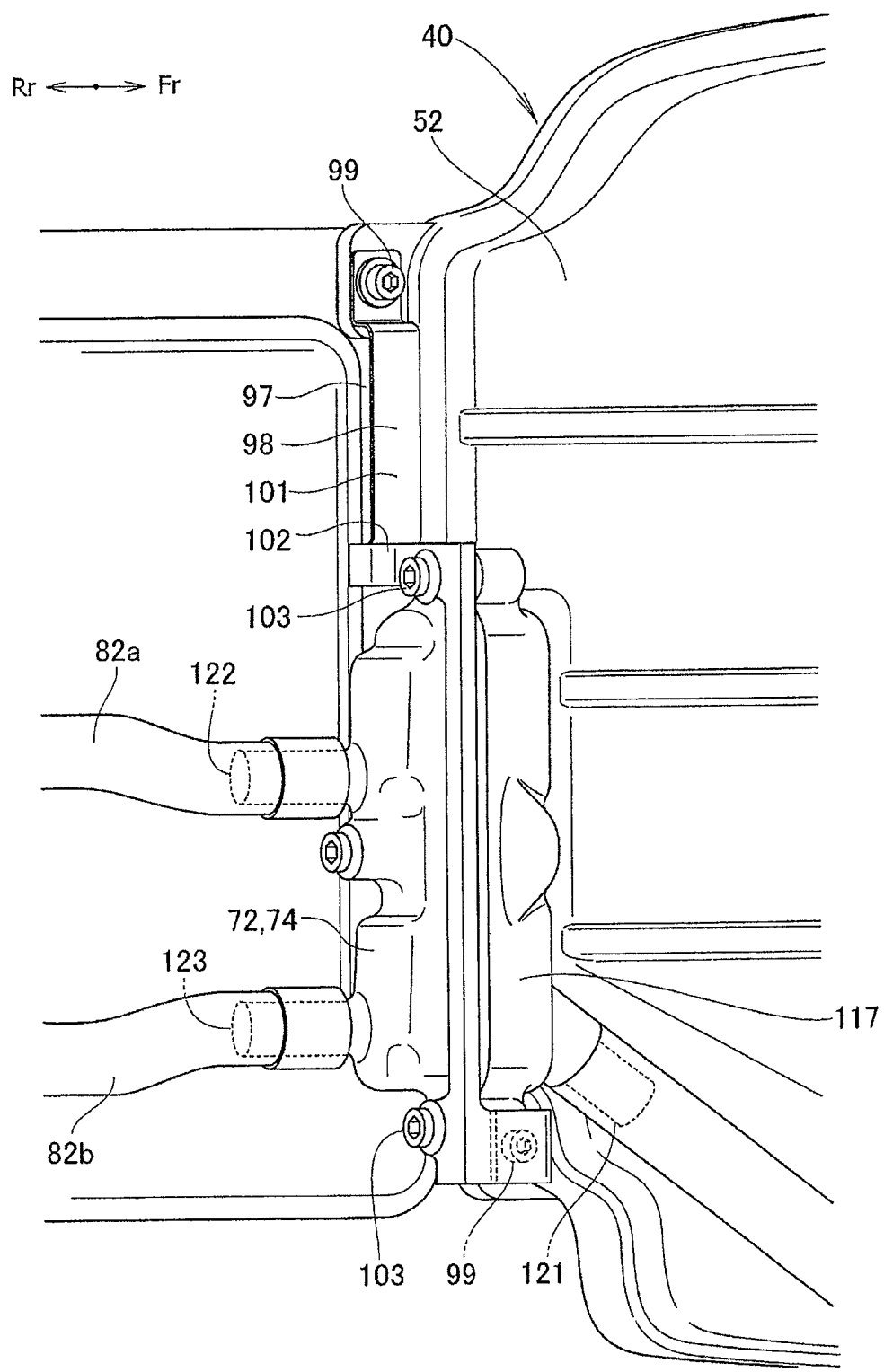
FIG. 9 is a view for explaining a mounting structure of a rear-side reed valve.

As shown in FIG. 9, a stay member 98 is provided on a rear wall 97 of the case body 52. The rear-side reed valve 74 is fastened to the rear wall 97 of the case body 52, through the stay member 98 therebetween, by screw members 99. The stay member 98 is a member extending in the transverse direction of the vehicle. The stay member 98 includes an air cleaner-side mounting portion 101 which is fastened to the rear wall 97 of the case body 52 and a reed valve-side mounting portion 102 which extends upwardly from the air cleaner-side mounting portion 101 (toward the viewer's side of the drawing) and to which the rear-side reed valve 74 is fastened.

The rear-side reed valve 74 is mounted to the reed valve-side mounting portion 102 by fastening members 103.

The rear-side reed valve 74 is thus fastened to the case body 52 utilizing the stay member 98, which is a separate member from the case body 52. This makes it unnecessary to provide a wall of the case body 52 with an elongated surface for fixing the rear-side reed valve 74 thereto. As a result, a degree of freedom in regard to the shape of the case body 52 can be secured, even in the case where the rear-side reed valve 74 is to be mounted to the case body 52.

The front-side reed valve is hereinafter described below.

Figure 10:
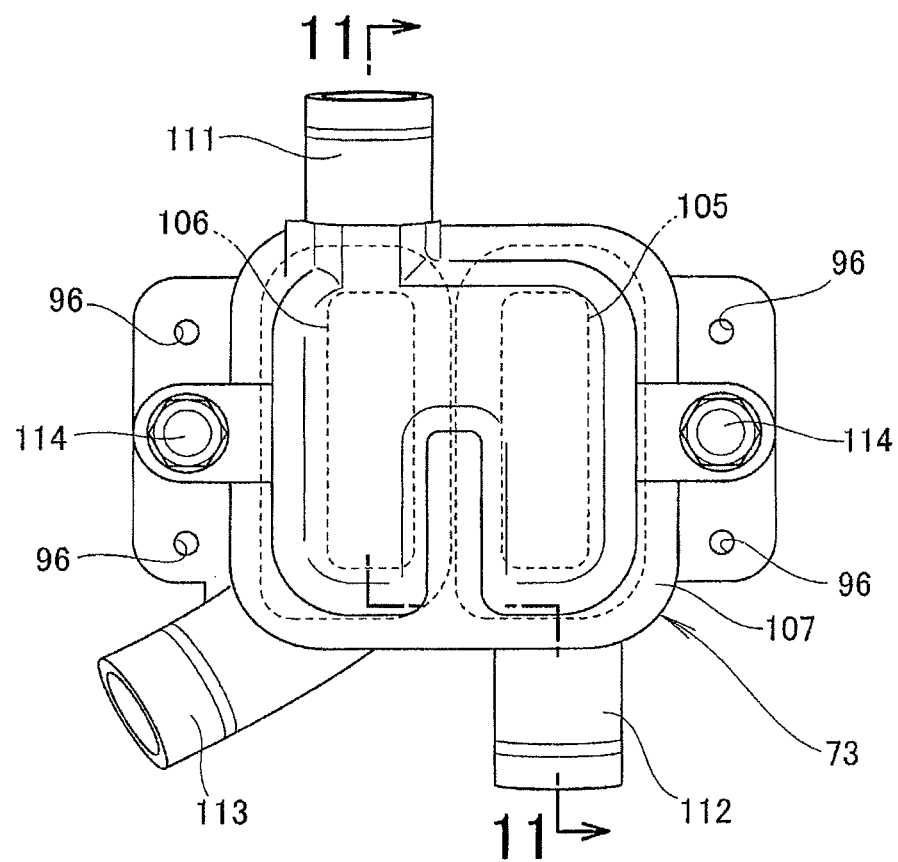
FIG. 10 is a front view of the front-side reed valve.

As illustrated in FIG. 10, the front-side reed valve 73 has left and right valve bodies 105 and 106 disposed so that the longitudinal direction of the front-side reed valve 73 lies in the vertical direction. The surroundings of the valve bodies 105 and 106 are covered with a front case member 107. The front case member 107 has one half 127 (see FIG. 11) and the other half 128 (see FIG. 11) which are fastened together by two screws 114. The front case member 107 is provided at an upper position thereof with a front input port 111 into which to insert the upstream-side front pipe line 77 (see FIG. 6). The front case member 107 is provided at lower positions thereof with a front first output port 112 and a front second output port 113 into which the front pipe line members 81a and 81b (see FIG. 6) are to be inserted and which serve as outlets for air outputted from the left and right valve bodies 105 and 106, respectively.

FIGS. 11(a) and 11(b) are sectional views taken along line 11-11 in FIG. 10, wherein FIG. 11(a) shows a state where the reed valve is closed, and FIG. 11(b) shows a state where the reed valve is open.

In FIGS. 10 and 11(a), the front-side reed valve 73 includes a plurality of reed valves (valve bodies 105 and 106) arranged in a row in the transverse direction of the vehicle. The valve bodies 105 and 106 are so arranged that the longitudinal direction of the front-side reed valve 73 is set along the height direction. The plurality of reed valves 105 and 106 constituting the front-side reed valve 73 are housed by the front case member 107 which is a separate body. The front case member 107 has the one half 127 and the other half 128, which are fastened together by the screws 114 to form the case member 107 as a united body.

Referring to FIGS. 3 and 6 as well, the front-side cylinder 31 includes two cylinders arranged in a row in the transverse direction of the vehicle. In addition, the front-side reed valve 73 includes the two reed valves 105 and 106 which are used respectively for the front-side cylinder exhaust pipes 33a and 33b extending from the two cylinders arranged in a row in the transverse direction of the vehicle.

In FIG. 11(b), when the solenoid valve 71 (see FIG. 3) is opened under predetermined conditions and a negative pressure is exerted on the exhaust port 31a (see FIG. 2), the valve body 106 is moved in the direction of arrow g in FIG. 11(b) by the negative pressure, so that cleaned air flows in the direction of arrow f in FIG. 11(b), from the front input port 111 toward the side of the front first and front second output ports 112 and 113, in the air cleaner 40.

The rear-side reed valve will be described below.

As shown in FIG. 12, the rear-side reed valve 74 has left and right valve bodies 115 and 116 so disposed that the longitudinal direction of the rear-side reed valve 74 lies in the transverse direction of the vehicle. The surroundings of the valve bodies 115 and 116 are covered with a rear case member 117. In the same manner as in the aforementioned front-side reed valve, the rear case member 117 has one half and the other half fastened together by a screw 124. The rear case member 117 is provided, on a front side, with a rear input port 121 into which to insert the upstream-side rear pipe line 78. The rear case member 117 is provided, on a rear side, with a first output port 122 and a second output port 123 into which the rear pipe line members 82*a* and 82*b* (see FIG. 3) are inserted and which serve as outlets for air outputted from the left and right valve bodies 115 and 116, respectively.

More specifically, the rear-side reed valve 74 includes a plurality of reed valves (valve bodies 115 and 116) arranged in a row in the transverse direction of the vehicle so that the longitudinal direction of the rear-side reed valve 74 lies along the transverse direction of the vehicle. The rear-side reed valve 74 is housed by the rear case member 117 which is a united body. The operation of the rear-side reed valve 74 is similar to that of the aforementioned front-side reed valve, so that description thereof is omitted here.

Since the plurality of the rear-side reed valves (valve bodies 115 and 116) are housed by the case member 117 which is a united body, the plurality of rear-side reed valves (valve bodies 115 and 116) can be arranged compactly. In addition, an increase in the number of component parts can be restrained.

Referring to FIG. 3, the rear-side reed valve 74 includes the plurality of reed valves (valve bodies 115 and 116) corresponding to the plurality of rear-side cylinders 32 which are arranged in a row in the transverse direction of the vehicle. The plurality of reed valves (valve bodies 115 and 116) are arranged in a row in the transverse direction of the vehicle. Therefore, the rear pipe line members 82*a* and 82*b* interconnecting the rear-side exhaust pipes (rear-side cylinder exhaust pipes 34) and the rear-side reed valve 74 can be arranged compactly and efficiently.

Referring to FIGS. 2 and 3, in the case where a space surrounded by the main frames 22 and the air cleaner 40 has a margin in the height direction, the reed valves (valve bodies 105 and 106) are so arranged that the longitudinal direction of the reed valves (valve bodies 105 and 106) lies in the height direction. In the case where the space surrounded by the main frames 22 and the air cleaner 40 has a margin in the transverse direction of the vehicle, on the other hand, the reed valves (valve bodies 115 and 116) are so arranged that the longitudinal direction of the reed valves (valve bodies 115 and 116) lies in the transverse direction of the vehicle.

The rear-side cylinder 32 includes two cylinders arranged in a row in the transverse direction of the vehicle. The rear-side reed valve 74 includes the two reed valves 115 and 116 which are used respectively for rear-side cylinder exhaust pipes 34 extending from the two cylinders arranged in a row in the transverse direction of the vehicle.

Since the plurality of front-side reed valves (valve bodies 105 and 106) are housed by the front case member 107 which is a united body, the plurality of front-side reed valves (valve bodies 105 and 106) can be arranged compactly. In addition, an increase in the number of component parts can be restrained.

The front-side reed valve 73 includes the plurality of reed valves (valve bodies 105 and 106) corresponding to the plurality of front-side cylinders 31 which are arranged in a row in the transverse direction of the vehicle. The plurality of reed valves (valve bodies 105 and 106) are arranged in a row in the transverse direction of the vehicle. Therefore, the front pipe line members 81 interconnecting the front-side exhaust pipes (front-side cylinder exhaust pipes 33) and the front-side reed valves (valve bodies 105 and 106) can be arranged compactly and efficiently.

An operation of the aforementioned saddle type vehicle will be described below.

Referring back to FIG. 3, the intake ducts 51L and 51R are connected respectively to left and right side surfaces of the air cleaner 40. The front-side reed valve 73 is disposed at the front portion 40*a* of the air cleaner 40, and the rear-side reed valve 74 is disposed at the rear portion 40*b* of the air cleaner 40. Thus, the intake ducts 51L and 51R, the front-side reed valve 73 and the rear-side reed valve 74 are arranged respectively in different positions, namely, at the side surfaces 40L and 40R, the front portion 40*a* and the rear portion 40*b* of the air cleaner 40. Therefore, interference among these components can be prevented from occurring. In addition, the intake ducts 51L and 51R, the front-side reed valve 73 and the rear-side reed valve 74 can be arranged efficiently and compactly.

The front-side reed valve 73 is disposed at the front portion 40*a* of the air cleaner 40 rearwardly of the head pipe 21, and is so arranged that its longitudinal direction lies along the height direction. On the rear side of the head pipe 21 and on the front side of the air cleaner 40, it is easier to secure a space in the height direction than to secure a space in the transverse direction of the vehicle. Since the front-side reed valve 73 is disposed at the front portion 40*a* of the air cleaner 40 in such a manner that its longitudinal direction lies along the height direction, the front-side reed valve 73 can be arranged efficiently and compactly.

In addition, the rear-side reed valve 74 is disposed at the rear portion 40*b* of the air cleaner 40 between the pair of main frames 22, and is so arranged that the longitudinal direction of the rear-side reed valve 74 lies along the transverse direction of the vehicle. On the rear side of the air cleaner 40, it is easier to secure a space in the transverse direction of the vehicle than to secure a space in the height direction.

Since the rear-side reed valve 74 is thus disposed at the rear portion 40*b* of the air, cleaner 40 in such a manner that its longitudinal direction lies along the transverse direction of the vehicle, the rear-side reed valve 74 can be arranged efficiently and compactly. Since the front-side reed valve 73 and the rear-side reed valve 74 can be arranged compactly, an influence of the reed valve 72 on those component parts which are disposed in the surroundings of the reed valve 72 can be reduced.

Referring to FIG. 5, in the case body 52 having the dirty side 62 formed on the lower side and the clean side 61 on the upper side, the intake ducts 51L and 51R are connected to the dirty side 62, whereas the secondary air supply system 70 is connected to the clean side 61 on the upper side. Thus, the intake ducts 51L and 51R and the secondary air supply system 70 are connected respectively to the lower side and the upper side of the air cleaner 40. Therefore, the intake ducts 51L and 51R and the secondary air supply system 70 can be spaced apart from each other. As a result, there is no fear of interference between the intake ducts 51L and 51R and the secondary air supply system 70, and it is possible to efficiently arrange the intake ducts 51L and 51R and the secondary air supply system 70.

Referring back to FIG. 2, the fuel tank 17 is so disposed so as to cover a space ranging from the upper side to the rear side of the air cleaner 40 where the secondary air supply system 70 is provided. Thus, the secondary air supply system 70 is covered by the fuel tank 17. Consequently, the secondary air supply system 70 can be protected on the upper side and the rear side thereof.

The main frames 22 and the front-side reed valve 73 overlap each other in side view of the vehicle. Since the front-side reed valve 73 is arranged so as to be hidden behind the main frames 22 in side view of the vehicle, the front-side reed valve 73 can be protected on the left and right sides thereof.

Furthermore, on a lateral side of the rear igniters 49, the rear pipe line members 82 for interconnecting the rear-side reed valve 74 and the rear-side cylinder exhaust pipes 34 extend from the front side toward the rear side of the vehicle. With the rear pipe line members 82 thus arranged so as not to protrude to the upper side of the rear igniters 49 provided for the rear-side cylinders 32, the rear pipe line members 82 can be arranged compactly and efficiently.

A second embodiment of the present invention will be described below referring to the drawings. Note that the same components in FIG. 13 as those shown in FIG. 11(*a*) are denoted by the same reference symbols used in FIG. 11(*a*), and a detailed description of the same components will be omitted hereinafter.

Figure 13:
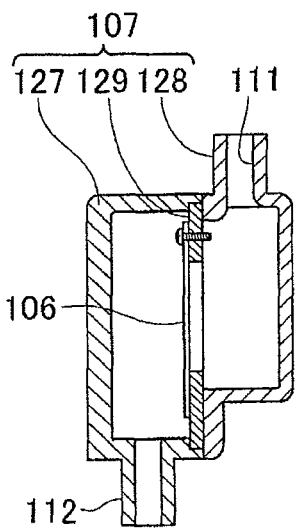
FIG. 13 is a sectional view of a front-side reed valve according to Embodiment 2.

As depicted in FIGS. 10 and 13, a front-side reed valve 73 includes a plurality of reed valves (valve bodies 105 and 106). The valve bodies 105 and 106 are so arranged that the longitudinal direction of the front-side reed valve 73 lies along the height direction. The plurality of reed valves 105 and 106 constituting the front-side reed valve 73 are housed by a front case member 107 provided as a separate body.

The front case member 107 includes one half 127, the other half 128, and a partition portion 129 clamped between the other half 128 and the one half 127. The front case member 107 has the one half 127 fastened to the other half 128 by screws 114 to form the case member 107 as a united body. With the front case member 107 thus configured by the three component parts of the one half 127, the partition portion 129 and the other half 128, the individual component parts can be easily molded. In addition, with the partition portion 129 clamped between the other half 128 and the one half 127, the front case member 107 can be simplified in structure. In addition, the partition portion 129 has an opening in its central portion, where the valve body 106 is provided. When the solenoid valve 71 (see FIG. 3) is opened under predetermined conditions and a negative pressure is exerted on the exhaust port 31*a* (see FIG. 2), the valve body 106 is opened by the negative pressure. Consequently, cleaned air flows from the front input port 111 toward the side of the front first and front second output ports 112 and 113, in the air cleaner 40.

A third embodiment of the present invention will be described referring to the drawings. Note that the same components in FIG. 14 as those depicted in FIG. 11(*a*) are denoted by the same reference symbols as used in FIG. 11(*a*), and a detailed description of the same components will be omitted hereinafter.

Figure 14:
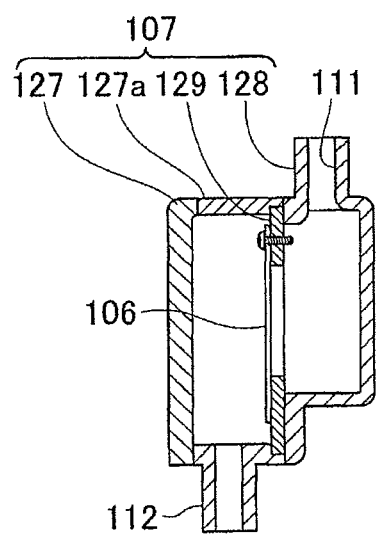
FIG. 14 is a sectional view of a front-side reed valve according to Embodiment 3.

As illustrated in FIGS. 10 and 14, a front-side reed valve 73 includes a plurality of reed valves (valve bodies 105 and 106). The valve bodies 105 and 106 are so arranged that the longitudinal direction of the front-side reed valve 73 lies in the height direction. The plurality of reed valves 105 and 106 constituting the front-side reed valve 73 are housed by a front case member 107 provided as a separate body.

The front case member 107 includes one half 127, a peripheral wall portion 127*a* extending from a peripheral edge of the one half 127, the other half 128, and a partition portion 129 clamped between the other half 128 and the peripheral wall portion 127*a*. The front case member 107 has the one half 127 fastened to the other half 128 by screws 114 to form the case member 107 as a united body. With the front case member 107 thus configured by the four component parts of the one half 127, the peripheral wall portion 127*a*, the partition portion 129 and the other half 128, the individual component parts can be molded further easily. In addition, the partition portion 129 has an opening in its central portion, where the valve body 106 is provided. When the solenoid valve 71 (see FIG. 3) is opened under predetermined conditions and a negative pressure is exerted on the exhaust port 31*a* (see FIG. 2), the valve body 106 is opened by the negative pressure. Consequently, cleaned air flows from the front input port 111 toward the side of the front first and front second output ports 112 and 113, in the air cleaner 40.

Note that while the present invention is applied to a motorcycle in the embodiments, the invention can be applied to three-wheeled vehicles, and may be applied to general vehicles.

In addition, the number of the reed valves arranged in the transverse direction of the vehicle may be increased according to the number of the cylinders arranged in the transverse direction of the vehicle. For instance, in the case where three cylinders are arranged in the transverse direction of the vehicle, three reed valves may be arranged in the transverse direction of the vehicle.

The present invention is suitable for application to a motorcycle provided with a secondary air supply system including a reed valve.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
   a body frame including a head pipe and a pair of main frames extending rearwardly from the head pipe;
   an engine mounted on the body frame, the engine including a front-side cylinder directed toward a front side of the vehicle and a rear-side cylinder directed toward a rear side of the vehicle;
   an air cleaner disposed in a space defined between the front-side cylinder and the rear-side cylinder on an upper side of the engine; and
   a secondary air supply system having a reed valve between the air cleaner and an exhaust passage of the engine, the secondary air supply system adapted to supply secondary air from the air cleaner into the exhaust passage of the engine or to stop the supply of the secondary air, with the engine and the air cleaner disposed between the pair of main frames;
   wherein the reed valve includes a front-side reed valve used for the front-side cylinder and a rear-side reed valve used for the rear-side cylinder;
   the front-side reed valve is disposed at a front portion of the air cleaner, with a longitudinal direction of the front-side reed valve set along a height direction; and
   the rear-side reed valve is disposed at a rear portion of the air cleaner, with a longitudinal direction of the rear-side reed valve set along a transverse direction of the vehicle.

2. The saddle vehicle according to claim 1,
   wherein a front-side cylinder exhaust pipe adapted to guide an exhaust gas is connected to an exhaust port of the front-side cylinder;
   the front-side cylinder exhaust pipe extends in a forward direction and then extends while bending so as to point rearwardly with a deviation toward one side or the other side with respect to a center line across the width of the vehicle;
   the front-side reed valve is disposed with an offset toward the same side, with respect to the center line across the width of the vehicle, as the deviation of the front-side cylinder exhaust pipe; and the front-side reed valve and the front-side cylinder exhaust pipe are connected together by a front pipe line member.

3. The saddle vehicle according to claim 1, wherein the front-side cylinder includes a plurality of cylinders arranged in a row in the transverse direction of the vehicle; and
the front-side reed valve includes a plurality of reed valves arranged in a row in the transverse direction of the vehicle.

4. The saddle vehicle according to claim 2, wherein the front-side cylinder includes a plurality of cylinders arranged in a row in the transverse direction of the vehicle; and
the front-side reed valve includes a plurality of reed valves arranged in a row in the transverse direction of the vehicle.

5. The saddle vehicle according to claim 1, wherein a rear-side cylinder exhaust pipe adapted to guide an exhaust gas is connected to an exhaust port of the rear-side cylinder;
the rear-side cylinder exhaust pipe extends so as to point rearwardly with a deviation toward one side or the other side with respect to a center line across the width of the vehicle;
the rear-side reed valve is disposed with an offset toward the same side as the deviation of the rear-side cylinder exhaust pipe; and
the rear-side reed valve and the rear-side cylinder exhaust pipe are connected together by a rear pipe line member.

6. The saddle vehicle according to claim 2, wherein a rear-side cylinder exhaust pipe adapted to guide an exhaust gas is connected to an exhaust port of the rear-side cylinder;
the rear-side cylinder exhaust pipe extends so as to point rearwardly with a deviation toward one side or the other side with respect to a center line across the width of the vehicle;
the rear-side reed valve is disposed with an offset toward the same side as the deviation of the rear-side cylinder exhaust pipe; and
the rear-side reed valve and the rear-side cylinder exhaust pipe are connected together by a rear pipe line member.

7. The saddle vehicle according to claim 3, wherein a rear-side cylinder exhaust pipe adapted to guide an exhaust gas is connected to an exhaust port of the rear-side cylinder;
the rear-side cylinder exhaust pipe extends so as to point rearwardly with a deviation toward one side or the other side with respect to a center line across the width of the vehicle;
the rear-side reed valve is disposed with an offset toward the same side as the deviation of the rear-side cylinder exhaust pipe; and
the rear-side reed valve and the rear-side cylinder exhaust pipe are connected together by a rear pipe line member.

8. The saddle vehicle according to claim 1, wherein the rear-side cylinder includes a plurality of cylinders arranged in a row in the transverse direction of the vehicle; and
the rear-side reed valve includes a plurality of reed valves arranged in a row in the transverse direction of the vehicle.

9. The saddle vehicle according to claim 2, wherein the rear-side cylinder includes a plurality of cylinders arranged in a row in the transverse direction of the vehicle; and
the rear-side reed valve includes a plurality of reed valves arranged in a row in the transverse direction of the vehicle.

10. The saddle vehicle according to claim 5, wherein an upper end of the rear-side cylinder is covered with a rear-side head cover;
a rear igniter is installed on the rear-side head cover; and
the rear pipe line member extends from a front side toward a rear side of the vehicle, on a lateral side of the rear igniter.

11. The saddle vehicle according to claim 1, wherein the front-side reed valve and the body frame overlap each other, in side view of the vehicle.

12. The saddle vehicle according to claim 2, wherein the front-side reed valve and the body frame overlap each other, in side view of the vehicle.

13. The saddle vehicle according to claim 3, wherein the plurality of front-side reed valves are housed by a united case member.

14. The saddle vehicle according to claim 8, wherein the plurality of rear-side reed valves are housed by a united case member.

15. A saddle vehicle comprising:
an engine including a front-side cylinder directed toward a front side of the vehicle and a rear-side cylinder directed toward a rear side of the vehicle;
an air cleaner disposed in a space defined between the front-side cylinder and the rear-side cylinder on an upper side of the engine; and
a secondary air supply system having a reed valve between the air cleaner and an exhaust passage of the engine, the secondary air supply system adapted to supply secondary air from the air cleaner into the exhaust passage of the engine or to stop the supply of the secondary air, with the engine and the air cleaner disposed between the pair of main frames;
wherein the reed valve includes a front-side reed valve used for the front-side cylinder and a rear-side reed valve used for the rear-side cylinder;
the front-side reed valve is disposed at a front portion of the air cleaner, with a longitudinal direction of the front-side reed valve set along a height direction; and
the rear-side reed valve is disposed at a rear portion of the air cleaner, with a longitudinal direction of the rear-side reed valve set along a transverse direction of the vehicle.

16. The saddle vehicle according to claim 15, wherein a front-side cylinder exhaust pipe adapted to guide an exhaust gas is connected to an exhaust port of the front-side cylinder;
the front-side cylinder exhaust pipe extends in a forward direction and then extends while bending so as to point rearwardly with a deviation toward one side or the other side with respect to a center line across the width of the vehicle;
the front-side reed valve is disposed with an offset toward the same side, with respect to the center line across the width of the vehicle, as the deviation of the front-side cylinder exhaust pipe; and
the front-side reed valve and the front-side cylinder exhaust pipe are connected together by a front pipe line member.

17. The saddle vehicle according to claim 15, wherein the front-side cylinder includes a plurality of cylinders arranged in a row in the transverse direction of the vehicle; and the front-side reed valve includes a plurality of reed valves arranged in a row in the transverse direction of the vehicle.

18. The saddle vehicle according to claim 15, wherein a rear-side cylinder exhaust pipe adapted to guide an exhaust gas is connected to an exhaust port of the rear-side cylinder;

the rear-side cylinder exhaust pipe extends so as to point rearwardly with a deviation toward one side or the other side with respect to a center line across the width of the vehicle;

the rear-side reed valve is disposed with an offset toward the same side as the deviation of the rear-side cylinder exhaust pipe; and the rear-side reed valve and the rear-side cylinder exhaust pipe are connected together by a rear pipe line member.

19. The saddle vehicle according to claim 15, wherein the rear-side cylinder includes a plurality of cylinders arranged in a row in the transverse direction of the vehicle; and the rear-side reed valve includes a plurality of reed valves arranged in a row in the transverse direction of the vehicle.

20. The saddle vehicle according to claim 19, wherein an upper end of the rear-side cylinder is covered with a rear-side head cover;

a rear igniter is installed on the rear-side head cover; and the rear pipe line member extends from a front side toward a rear side of the vehicle, on a lateral side of the rear igniter.

* * * * *